(12) United States Patent
Igarashi et al.

(10) Patent No.: US 7,749,431 B2
(45) Date of Patent: Jul. 6, 2010

(54) STAINLESS STEEL FOR HIGH-PRESSURE HYDROGEN GAS

(75) Inventors: Masaaki Igarashi, Sanda (JP); Hiroyuki Semba, Sanda (JP); Mitsuo Miyahara, Kobe (JP); Kazuhiro Ogawa, Nishinomiya (JP); Tomohiko Omura, Kishiwada (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 389 days.

(21) Appl. No.: 11/108,098

(22) Filed: Apr. 18, 2005

(65) Prior Publication Data
US 2005/0178477 A1    Aug. 18, 2005

Related U.S. Application Data

(63) Continuation of application No. PCT/JP2004/003809, filed on Mar. 19, 2004.

(30) Foreign Application Priority Data

Mar. 20, 2003  (JP) ............................. 2003-078967
Jun. 10, 2003  (JP) ............................. 2003-165623

(51) Int. Cl.
C22C 38/58    (2006.01)
C22C 38/46    (2006.01)

(52) U.S. Cl. ............................ 420/44; 420/45; 420/46; 420/47; 420/48; 420/56; 420/57; 420/58; 420/59; 420/73; 420/74; 420/584.1; 420/585; 420/586.1; 148/327; 148/329; 148/326; 148/419; 148/442

(58) Field of Classification Search ............. 420/72–74, 420/44–48, 584.1, 56–59, 585, 586.1; 148/327, 148/329, 326, 419, 442
See application file for complete search history.

(56) References Cited

U.S. PATENT DOCUMENTS 3,201,233 A    8/1965    Hull
(Continued)

FOREIGN PATENT DOCUMENTS

DE    37 29 577 C1    9/1988
(Continued)

OTHER PUBLICATIONS

English translation of Soviet Union patent 1595936, Bannykh et al. Sep. 30, 1990.*
(Continued)

Primary Examiner—Deborah Yee
(74) Attorney, Agent, or Firm—Clark & Brody

(57) ABSTRACT

A high-strength stainless steel, having good mechanical properties and corrosion resistance in a high-pressure hydrogen gas environment, is used as a container or other device for high-pressure hydrogen gas, and consists of, by mass %, C: not more than 0.04%, Si: not more than 1.0%, Mn: 7 to 30%, Cr: 15 to 22%, Ni: 5 to 20%, V: 0.001 to 1.0%, N: 0.20 to 0.50% and Al: not more than 0.10%, and the balance Fe and impurities. Among the impurities, P is not more than 0.030%, S is not more than 0.005%, and Ti, Zr and Hf are not more than 0.01% respectively, and the contents of Cr, Mn and N satisfy the relationship, $2.5Cr+3.4Mn \leq 300N$. The weld metal of the welded joint of the container or other device made of the said stainless steel satisfies the relationship, $-11 \leq Nieq-1.1 \times Creq \leq -8$.

15 Claims, 8 Drawing Sheets

U.S. PATENT DOCUMENTS

| | | | |
|---|---|---|---|
| 3,592,634 | A | 7/1971 | Denhard, Jr. et al. |
| 3,726,668 | A | 4/1973 | Baumel et al. |
| 5,116,569 | A | 5/1992 | Kasahara et al. |
| 5,411,701 | A * | 5/1995 | Holmberg .................... 420/48 |
| 2002/0006349 | A1 | 1/2002 | Ohma |

FOREIGN PATENT DOCUMENTS

| | | |
|---|---|---|
| EP | 0 446 188 A1 | 9/1991 |
| EP | 0 812 927 A2 | 12/1997 |
| JP | 05-065601 | 3/1993 |
| JP | 05-098391 | 4/1993 |
| JP | 06-128699 | 5/1994 |
| JP | 6-264135 | 9/1994 |
| JP | 07-026350 | 1/1995 |
| JP | 07-188863 | 7/1995 |
| JP | 7-310144 | 11/1995 |
| JP | 8-134593 * | 5/1996 |
| JP | 8-269636 | 10/1996 |
| JP | 2003-222299 | 8/2003 |
| JP | 2003-269695 | 9/2003 |
| SU | 1595936 * | 9/1990 |

OTHER PUBLICATIONS

C.W. Wegst, "Stahlschlüssel 2001", Germany, XP00244138, p. 471, examples 479, 517.

C. Ouchi et al., "Mn-Cr and Ni-Cr Stainless Steels for Cryogenic Use", *Nippon Kokan Technical Report*, Overseas, No. 51 (1987), pp. 20-27, XP009086212.

J. Isasi et al., "Cracking in Welded Steam Pipe", *Welding Research, Supplement to the Welding Journal*, Dec. 1971, pp. 493-s-506-s.

* cited by examiner

100 μm

1 μm

US 7,749,431 B2

STAINLESS STEEL FOR HIGH-PRESSURE HYDROGEN GAS

This application is a continuation of International Patent Application No. PCT/JP2004/003809 filed Mar. 19, 2004. This PCT application was not in English as published under PCI Article 21(2).

FIELD OF THE INVENTION

This invention relates to a stainless steel, having good mechanical properties (strength, ductility) and corrosion resistance in a high-pressure hydrogen gas environment. This invention relates also to a container or piping for high-pressure hydrogen gas, or an accessory part or device belonging thereto, which is made of the steel. These containers and so forth include structural equipment members, especially cylinders, piping and valves for fuel cells for vehicles or hydrogen gas stations, for example, which are exposed in a high-pressure hydrogen gas environment.

BACKGROUND ART

Fuel cell-powered vehicles depend on electric power from hydrogen and oxygen as fuels and have attracted attention as the next-generation dean vehicles, which do not emit such hazardous substances as carbon dioxide [$CO_2$], nitrogen oxide [$NO_x$] and sulfur oxide [$SO_x$], unlike the current conventional gasoline engine vehicles or diesel engine vehicles. In Japan, the introduction of 5 million such vehicles prior to 2020 is planned under the leadership of the Japanese Ministry of Economy, Trade and Industry.

At present, the greatest problems to be solved before the practical use of these fuel cell-powered vehicles are how to generate the fuel, i.e., hydrogen, and how to store it. Various research and development work is going on at the present time.

Typical methods are loading a hydrogen gas cylinder into the vehicle, generating hydrogen by reforming methanol or gasoline in a reformer carried on the vehicle, and installing a hydrogen storage alloy with hydrogen adsorbed therein in the vehicle.

While each of these methods has its merits and demerits, fuel cell-powered vehicles carrying a hydrogen gas cylinder, were first put on the world market by Japan in December 2002 (Heisei 14), and several of them are already in use as official cars by the Japanese Ministry of Land, Infrastructure and Transport and so on.

However, while the current fuel cell-powdered vehicles are already performing close to the standard of gasoline-driven private cars with a maximum speed of about 150 km/hr and power of about 100 horsepower, the maximum range is less than 300 km due to the limited cylinder size, and this problem has prevented them from coming into wide use.

The method for installing a reformer, which uses methanol or gasoline as a fuel, still has some problems; for example, methanol is toxic and the gasoline needs to be desulphurized. Also an expensive catalyst is required at the present time and, further, the reforming efficiency is unsatisfactory, hence the $CO_2$ emission reducing effect does not justify the increase in cost.

The method which uses a hydrogen storage alloy has technological problems. For example the hydrogen storage alloy is very expensive, and excessive time is required for hydrogen absorption, which corresponds to fuel charging, and the hydrogen storage alloy deteriorates by repeating absorption and releasing hydrogen. Therefore the great deal of time is still required before this method can be put into practical use.

With the background discussed above, various research and development work is being encouraged in Japan in order to improve the performance of the fuel cell-powered vehicles carrying a high-pressure gas cylinder, and also reduce the cost of its production. In order to popularize the so-called next-generation clean vehicles, it is necessary to overcome the following problems.

The range of the fuel cell-powered vehicles should be increased. The infrastructure for example, the hydrogen stations necessary for the popularization of the car should be prepared. And the technology to improve the safety in handling of hydrogen should be developed.

A trial calculation indicates that, in order to extend the range of the vehicle to 500 km, for instance, the hydrogen gas pressure in the cylinder to be carried on the vehicle should be increased from the current level of 35 MPa to a higher level of 70 MPa. Further, hydrogen gas stations become necessary instead of the existing gasoline stations and, accordingly, the generation, transportation and storage of high-pressure hydrogen gas, as well as rapid charging (feeding to vehicles) thereof, become necessary.

Since hydrogen gas is flammable, close attention should be paid in handling it. As for the interaction between hydrogen gas under very high pressure exceeding 50 MPa in particular, and the structural equipment members, there are a number of points that remain unclear, hence it is imperative that the technology for the safe utilization of equipment be established.

The material used in the high-pressure hydrogen gas equipment in the fuel cell-powered vehicles commercialized in 2002 (Heisei 14) is an austenitic stainless steel, i.e., JIS SUS 316 type material, whose reliability has been widely recognized in the art. This is because this steel has better hydrogen embrittlement insusceptibility, in an environment of up to 35 MPa hydrogen than other structural steels such as JIS STS 480 type carbon steel and SUS 304 type stainless steel, and also is excellent in workability and weldability, and the technology of its utilization has been established.

However, in using this SUS 316 steel as piping for high-pressure hydrogen gas, whose gas pressure has been increased from 35 MPa to 70 MPa, the outer diameter of the pipe should be increased to 34.7 mm, the inner diameter to 20 mm (pipe wall thickness 7.35 mm), for instance, as compared with the conventional outer diameter of 26.2 mm and the inner diameter of 20 mm (wall thickness 3.1 mm). Thus, the piping cannot endure unless the pipe wall thickness is increased twice or more and the weight three times. Therefore, a marked increase in on-board equipment weight and in size of gas stations will be inevitable, presenting serious obstacles to practical use.

It is known that cold working increases the strength of austenitic stainless steel. Therefore it is possible to avoid the increase in the pipe wall thickness by increasing the strength with such cold working as drawing and rolling.

High-level strength can be obtained by such cold working. However the ductility and toughness markedly decrease and, further, an anisotropy problem may arise due to such working. In addition, it has been made clear that cold-worked austenitic stainless steel shows a marked increase in hydrogen embrittlement susceptibility in a high-pressure hydrogen gas environment, and it has been found that, considering the safety in handling high-pressure hydrogen gas, cold working cannot be employed for increasing pipe strength.

As for the method of strengthening austenitic stainless steel, the so-called solid solution hardening method, in which a large amount of nitrogen [N], as a solid solution element is used, is known from Japanese Patent Laid-open (JP Kokai) Nos. H05-65601 and H07-188863. Further, in JP Kokai No. H05-98391, there is proposed a precipitation hardening method, which comprises causing precipitation of carbides and/or nitrides. However, these conventional strengthening technologies inevitably decrease ductility and toughness and, in particular, cause an increase in anisotropy in toughness, possibly leading to the same problem as in the cold working when the pipes are used in a high-pressure hydrogen gas environment.

Furthermore, in JP Kokai No. H06-128699 and JP Kokai No. H07-26350, there are proposed stainless steels, in which corrosion resistance is improved by adding a large amount of nitrogen [N]. However, these steels do not have characteristics to cope with a high-pressure hydrogen gas environment; hence it is not easy to secure the safety for the same reasons as mentioned above.

The containers and piping for high-pressure hydrogen and accessory parts or devices that belong thereto are often manufactured by welding. The welded joints also have the following problems. Namely, a decrease in strength occur in the weld metal of the joints due to melting and solidification, and in the welding heat affected zone due to heat cycles in welding. This decrease in the strength in the welding heat affected zone can be prevented by carrying out appropriate heat treatment after welding. However, the weld metal has a coarse solidification structure, and, therefore, the strength thereof cannot be improved by mere post-welding heat treatment.

DISCLOSURE OF INVENTION

The primary objective of the present invention is to provide a high-strength stainless steel, having superior mechanical properties and corrosion resistance in a high-pressure hydrogen gas environment, and to provide containers, piping and other parts or devices for high-pressure hydrogen gas, which are manufactured from the above-mentioned stainless steel.

The second objective of the invention is to provide such containers, piping and other parts or devices as mentioned above which have welded joint(s) with improved characteristics such as high strength, low-temperature toughness and small susceptibility to hydrogen embrittlement.

Next, findings that have led to completion of the invention will be described.

The present inventors conducted various investigations concerning the influences of the chemical composition and metallurgical structure (microstructure) of each of the various materials on the mechanical properties and corrosion resistance in a high-pressure hydrogen gas environment. As a result, the following facts have been learned.

1) As is generally known, solid solution hardening with N is most effective for increasing the strength of the conventional austenitic stainless steel. With the increasing of the addition of N, the strength increases but the ductility and toughness decrease, and, at the same time, the anisotropy becomes significant. However, by properly selecting constituent elements such as Mn, Cr, Ni and C and properly adjusting the contents thereof, it becomes possible to prevent the ductility and toughness from decreasing and, further, to solve the anisotropy problem.

2) When N is added to the conventional austenitic stainless steel at a level exceeding the solubility limit, Cr nitrides such as CrN and $Cr_2N$ are formed. Insofar as they are finely dispersed, these nitrides contribute to increasing the strength. Coarse nitrides, however, not only deteriorate the ductility and toughness but also increase the hydrogen embrittlement susceptibility.

3) Nitrides such as CrN and $Cr_2N$ are hexagonal in crystal structure and poor in coherency with the matrix lattice of the austenite phase and, therefore, readily aggregate and become coarser. However, when V is added to the steel containing adequately selected alloying elements, such as Ni and Cr, at adjusted content levels, V can be contained in the Cr nitrides. Even when remaining hexagonal in a crystal structure, such Cr nitrides are improved in coherency with the austenite phase matrix lattice and become difficult to coarsen. Further, V-containing Cr nitrides are converted at least partly to the cubic system nitrides. These cubic system nitrides have good coherency with the matrix phase and can be precipitated in a finely dispersed state. To sum up, when V is contained in the steel, Cr nitrides can be finely dispersed even if they are hexagonal in a crystal structure and, further, after conversion of part thereof to cubic system nitrides, the fine dispersion becomes more certain.

4) The strength, ductility and toughness and, further, hydrogen embrittlement insusceptibility of the austenitic stainless steel vary considerably according to different states of dispersion due to the differences in the crystal structure of Cr nitrides as mentioned above.

5) It is generally known that when the grain size in austenitic stainless steel is reduced, the proof stress increases, but, at the same time, the ductility decreases. However, in the steel, wherein N is added and the alloying elements, such as Mn, Cr, Ni and C are properly selected, and the contents thereof are adequately adjusted, the grain refinement makes the strength higher without decreasing ductility so much.

6) Since the weld metal of the welded joint has a coarse solidification structure as mentioned above, the strength thereof will not be improved by the conventional heat treatment following welding. However, by specifying the relation between Nieq and Creq in the weld metal, it becomes possible to improve not only its strength but also other mechanical properties and the hydrogen embrittlement resistance.

The present invention has been completed based on the above findings and the gist thereof consists in the stainless steel defined below under [1] and the containers and the like defined below under [2] and [3]. In the subsequent description, the "%" indicating the content of each component means "% by mass".

(1) A stainless steel for a high-pressure hydrogen gas characterized in that the steel consists of C: not more than 0.04%, Si: not more than 1.0%, Mn: 7 to 30%, Cr: 15 to 22%, Ni: 5 to 20%, V: 0.001 to 1.0%, N, 0.20 to 0.50% and Al: not more than 0.10%, and the balance Fe and impurities, wherein, among the impurities, P is not more than 0.030%, S is not more than 0.005%, and Ti, Zr and Hf are not more than 0.01% respectively, and further characterized in that the contents of Cr, Mn and N satisfy the following relationship [1]:

$$2.5Cr+3.4Mn \leq 300N \qquad [1]$$

wherein the symbols of the elements represent the contents of the respective elements (% by mass).

This stainless steel may contain at least one element selected from at least one group out of the following first to third group:

The first group of elements;
  Mo: 0.3 to 3.0%, W: 0.3 to 6.0%, Nb: 0.001 to 0.20%, and
    Ta: 0.001 to 0.40%.

The second group of elements;
B: 0.0001 to 0.020%, Cu: 0.3 to 5.0%, and Co: 0.3 to 10.0%.
The third group of elements;
Mg: 0.0001 to 0.0050%, Ca: 0.0001 to 0.0050%, La: 0.0001 to 0.20%, Ce: 0.0001 to 0.20%, Y: 0.0001 to 0.40%, Sm: 0.0001 to 0.40%, Pr: 0.0001 to 0.40%, and Nd: 0.0001 to 0.50%.

Further, it is desirable that this stainless steel has at least one of the following characteristics [a] to [d] in its microstructure:
 [a] The mean austenite grain size is not greater than 20 μm;
 [b] Fine nitride precipitates of not greater than 0.1 μm are dispersed in an amount of not less than 0.005% by volume;
 [c] The fine nitride precipitates of not greater than 0.1 μm contain not less than 10 mass % of V within them;
 [d] The fine nitride precipitates of not greater than 0.1 μm are face-centered cubic in crystal structure.

(2) A container, piping or accessory part or device for a high-pressure hydrogen gas that is made of the stainless steel defined above under (1).

The container includes cylinders, tanks and other storage vessels, the piping includes pipes connecting such containers to each other or connecting such containers to other parts or devices, and the accessory part or device includes valves and other parts or devices belonging to the containers or piping.

(3) A container, piping or accessory part or device for a high-pressure hydrogen gas which is made of the stainless steel defined in above (1), characterized in that the weld metal of the welded joint thereof consists of C: not more than 0.04%, Si: not more than 1.0%, Mn: 7 to 30%, Cr: 15 to 22%, Ni: 4 to 20%, V: 0.05 to 1.0%, Mo: 0 to 3.0%, N, 0.20 to 0.50%, Al: not more than 0.10%, and each of Ti, Nb, Zr and Hf: 0 to 0.01%, and the balance Fe and impurities, among the impurities, P is not more than 0.030% and S is not more than 0.005%, and that the following relationship [2] is satisfied:

$$-11 \leq Nieq - 1.1 \times Creq \leq -8 \quad [2]$$

$$\text{where } Nieq = Ni + 30 \times (C+N) - 0.5 \times Mn \quad [3] \text{ and}$$

$$Creq = Cr + Mo + 1.5 \times Si \quad [4].$$

In the above formulas [3] and [4], the symbols of the elements represent the contents of the respective elements (% by mass).

The above-mentioned weld metal may contain at least one element selected from at least one of the following groups (a) to (c):
 (a) W and Ta in the said first group,
 (b) Elements in the said second group, and
 (c) Elements in the said third group.

BEST MODES FOR CARRYING OUT THE INVENTION

Figure 1:
FIG. 1 is an optical photomicrograph of the steel of the invention.

1. Stainless Steel of the Present Invention

The effects of the components constituting the stainless steel of the present invention and the grounds for restriction of the contents thereof will be described below in detail.

C: not more than 0.04%

In austenitic stainless steels, precipitation of $M_{23}C_6$ and MC type carbides [M: Ti, Nb, Ta, etc.] is often used for improving corrosion resistance. However, the precipitation of carbides is not necessary in the steel of the present invention. On the contrary, since the carbides precipitated on grain boundaries deteriorate toughness of the steel, the C content is restricted to not more than 0.04%. Although the C content is desirably as low as possible, an extreme reduction of C content causes an increase in cost of refining. Practically, it is desirably not lower than 0.0001%.

Si: not more than 1.0%

Si is known to be an element effective in improving the corrosion resistance in certain environments. When its content is high, however, it may form intermetallic compounds with Ni, Cr and so on or promote the formation of such intermetallic compounds as the sigma phase, possibly causing marked deterioration in hot workability. Therefore, the Si content should be not more than 1.0%. More preferably, it is not more than 0.5%. The Si content is desirably as low as possible but, considering the cost of refining, it is desirably not less than 0.001%.

Mn: 7 to 30%

Mn is an inexpensive austenite-stabilizing element. In the steel of the present invention, Mn contributes toward increasing the strength and improving the ductility and toughness, when appropriately combined with Cr, Ni, N and so forth. Therefore, Mn is caused to be contained in the steel at a level of not lower than 7%. At levels exceeding 30%, however, the hot workability and/or atmospheric corrosion resistance may decrease in some instances. Therefore, 7 to 30% is the proper content. A more desirable Mn content is 7 to 17%.

Cr: 15 to 22%

Cr is an essential component to serve as an element improving the corrosion resistance in a high-pressure hydrogen gas environment. For producing these effects, a content thereof exceeding 15% is necessary. When Cr is too much, however, nitrides such as CrN and $Cr_2N$ and $M_{23}C_6$ type carbides, which are injurious to the ductility and toughness, tend to be formed in large amounts. Therefore, the proper content of Cr is 15 to 22%.

Ni: 5 to 20%

Ni is added as an austenite-stabilizing element. In the steel of the present invention, it contributes toward increasing the strength and improving the ductility and toughness when appropriately combined with Cr, Mn, N and so forth. Therefore, the Ni content should be not less than 5%. At levels exceeding 20%, however, the increment in effect is small and increases in material cost will result. Therefore, 5 to 20% is the proper content.

V: 0.001 to 1.0%

In the steel of the present invention, V improves the coherency of hexagonal Cr nitrides with the matrix phase, prevents them from becoming coarser and, further, promotes the formation of cubic Cr nitrides. Further, V dissolves as a solid solution in CrN and $Cr_2N$ and prevents them from coarsening, and thus greatly contributing toward increasing the strength, improving the ductility, toughness and the hydrogen embrittlement resistance. For producing these effects, a content of not less than 0.001% is necessary. On the other hand, when the content exceeds 1.0%, the increment in effect is small but the material cost increases. Therefore, the upper limit is set at 1.0%. The V content desirable for an increase in yield of cubic Cr nitrides is 0.05 to 1.0%, most desirably 0.1 to 1.0%.

N: 0.20 to 0.50%

N is the most important element for solid solution hardening, and, in the respective proper content ranges of Mn, Cr, Ni, C and so forth, it contributes toward increasing the strength and at the same time prevents the formation of intermetallic compounds such as the sigma phase, and thus contributes toward improving the toughness. For these purposes, a content of not lower than 0.20% is necessary. When N exceeds 0.50%, however, the formation of coarse hexagonal nitrides, such as CrN and $Cr_2N$, becomes inevitable. Therefore, the proper content is 0.20 to 0.50%. Meanwhile, when the balance among Mn, Cr and N in the steel of the present invention satisfies the relationship [1] given below, both high strength and high ductility features can be embodied in the most balanced manner. In the formula [1], the symbols of the elements represent the contents of the respective elements (% by mass).

$$2.5Cr+3.4Mn \leq 300N \qquad [1]$$

The coefficients given to Cr and Mn in the above formula [1] were obtained from the contributions of Cr and Mn to the solubility limit of N and from the tendency toward sigma phase formation.

Al: not more than 0.10%

Al is an element important as a deoxidizer but the content thereof in excess of 0.10% promotes the formation of intermetallic compounds such as the sigma phase. Therefore, such content is undesirable for the balance between strength and toughness as intended by the present invention. For securing the deoxidizing effect, a content of not lower than 0.001% is desirable.

An embodiment of the steel of the present invention comprises the above-mentioned components, with the balance being Fe and impurities. The restrictions to be imposed on some specific elements among the impurities will be described herein later.

Another embodiment of the steel of the present invention further comprises at least one element selected from at least one group among the first to the third group described below.

The elements belonging to the first group are Mo, W, Nb and Ta. These are substantially equivalent in their effect of promoting the formation and stabilization of cubic nitrides. The grounds for restrictions of the respective contents are as follows.

Mo: 0.3 to 3.0%, W: 0.3 to 6.0%

Mo and W are effective in stabilizing cubic nitrides and serve also as solid solution hardening elements. Therefore, one or both may be added according to need. They are effective at levels of not lower than 0.3% respectively. At excessively high addition levels, however, austenite becomes unstable. Therefore, when they are added, it is recommended that their contents should be 0.3 to 3.0% and 0.3 to 6.0% respectively.

Nb: 0.001 to 0.20%, Ta: 0.001 to 0.40%

Nb and Ta, like V, form cubic nitrides and, therefore, one or both of them may be added according to need. The effect becomes significant at respective levels not lower than 0.001%. At excessively high addition levels, however, austenite becomes unstable. Therefore, when they are added, it is recommended that their contents should be not more than 0.20% and 0.40% respectively.

The elements belonging to the second group are B, Cu and Co. These contribute toward improving the strength of the steel of the present invention. The grounds for restrictions of the respective contents are as follows.

B: 0.0001 to 0.020%

B makes the precipitate and austenite crystal grain size finer and increases the strength. Therefore, it can be added according to need. Such effects are produced at levels of not lower than 0.0001%. On the other hand, an excessive content may result in the formation of low melting point compounds, leading to deterioration of hot workability. Therefore, the upper limit is set at 0.020%.

Cu: 0.3 to 5.0%, Co: 0.3 to 10.0%

Cu and Co are austenite-stabilizing elements. When appropriately combined with Mn, Ni, Cr and C in the steel of the present invention, they contribute toward further increasing the strength. Therefore, one or both of them can be added at levels of not lower than 0.3% respectively according to need. Considering the balance between the effect and the material cost, however, the upper limits of their contents are set at 5.0% and 10.0% respectively.

The elements belonging to the third group are Mg, Ca, La, Ce, Y, Sm, Pr and Nd. The effects of these and the grounds for restrictions of the respective contents are as described below.

In the composition range of the steel of the present invention, Mg and Ca, and La, Ce, Y, Sm, Pr and Nd among the transition metals have the ability to prevent cracking upon solidification in the step of casting, and have the effect of preventing a decrease in ductility due to hydrogen embrittlement after a long period of use. Therefore, one or more of them may be contained in the steel according to need. Each produces its effect at levels of not lower than 0.0001%. However, at excessively high content levels, each reduces the hot workability. Therefore, the upper limit is set at 0.0050% for each of Mg and Ca, 0.20% for each of La and Ce, 0.40% for each of Y, Sm and Pr, and 0.50% for Nd.

Now, the restrictions as to impurities are described. In the stainless steel of the present invention, restrictions are imposed upon P, S, Ti, Zr and Hf among the impurities as follows.

P: not more than 0.030%; S: not more than 0.005%

Both of P and S are elements adversely affecting the toughness and other properties of the steel. Therefore, their content is preferably as low as possible. However, at their levels not higher than 0.030% and 0.005% respectively, no significant deterioration in characteristics of the steel of the present invention is observed.

Ti, Zr, and Hf: not more than 0.01% Respectively

Ti, Zr and Hf, like V, form cubic nitrides but form nitrides in preference to V in a higher temperature range and, therefore, they inhibit the formation of V-based nitrides. In addition, the nitrides of Ti, Zr and Hf are not good in coherency with the austenite matrix, so that they themselves tend to aggregate and become coarse and are less effective in improving the strength. Therefore, their contents are restricted to 0.01% or below respectively.

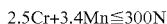

2.5Cr+3.4Mn≦300N

Figure 7:
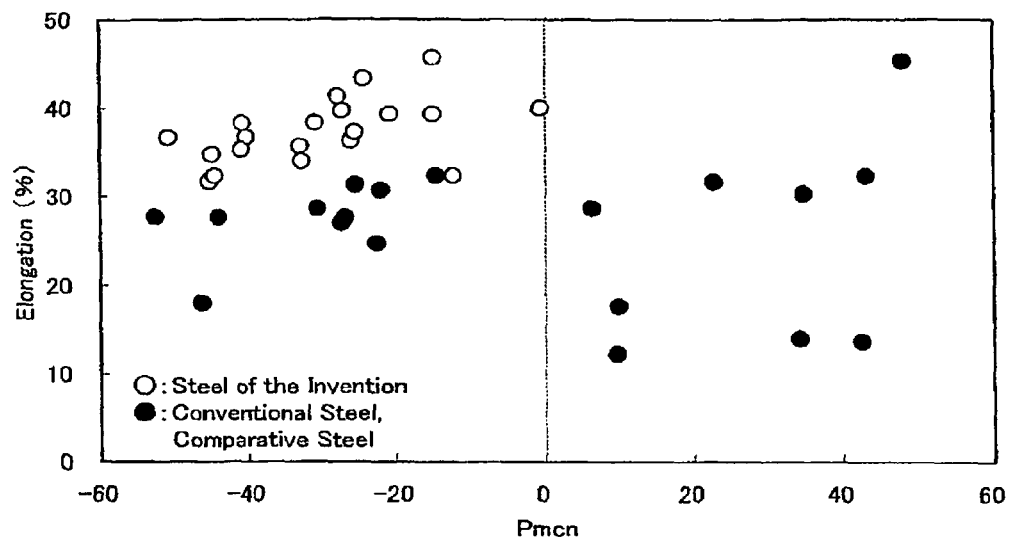
FIG. 7 is a graphic representation of the relations between the Pmcn2 (5Cr+3.4 Mn−500N) and the ductility (elongation) as found for the steels of the present invention, conventional steels and steels for comparison.
Figure 8:
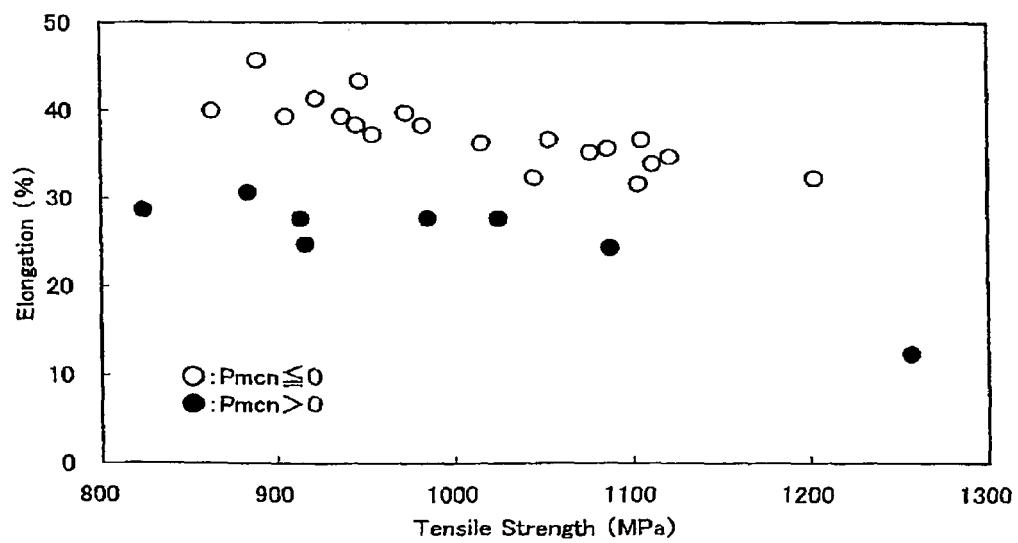
FIG. 8 is a graphic representation of the relations between the tensile strength and the ductility (elongation) as found for the steels of the present invention, conventional steels and steels for comparison.

The contents of Cr, Mn and N are required to satisfy the above relation (relation [1]) because when the relation [1] is satisfied, namely when Pmcn≦0, the tensile strength of the steel becomes high and the elongation increases, as shown in FIG. 7 and FIG. 8. In FIG. 7 and FIG. 8, the abscissa Pmcn denotes "2.5Cr+3.4Mn−300N".

The stainless steel of the present invention is used as hot-worked or after one or more heat treatments of heating at a temperature between 700 and 1,200° C. The desirable metallurgical structure can be obtained even as hot-worked, depending on the heating temperature during hot working and/or the cooling conditions after hot working. When the above heat treatment is carried out after hot working or after various processing treatments subsequent to hot working, the desirable structure mentioned below can be obtained with more certainty.

It is desirable that the stainless steel of the present invention be structured as follows.

Figure 10:
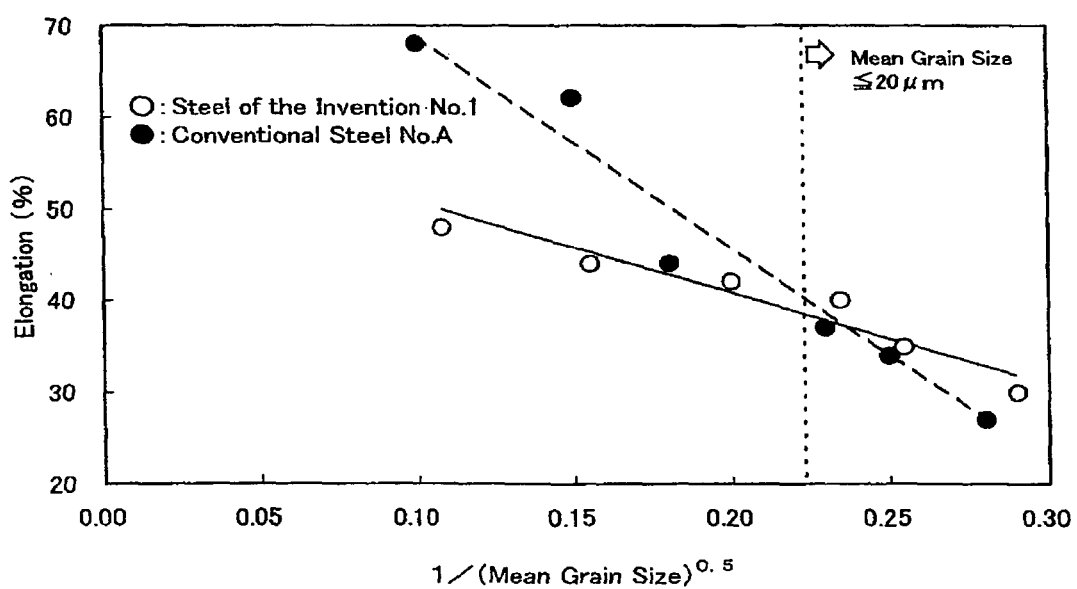
FIG. 10 is a graphic representation of the relations between "1/(mean grain diameter)$^{0.5}$" and the elongation as found for a steel of the present invention and a conventional steel.
Figure 11:
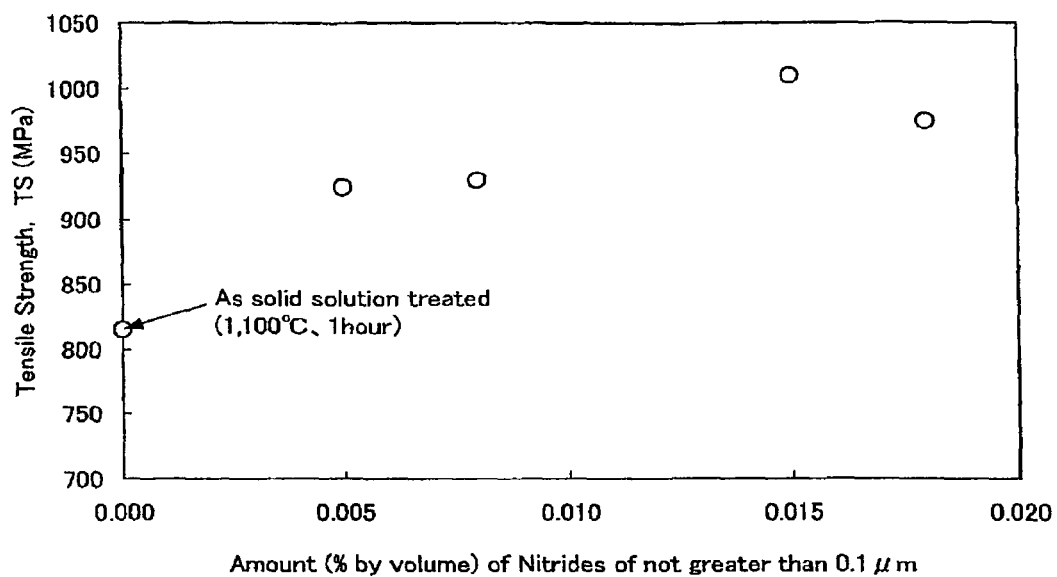
FIG. 11 is a graphic representation of the relation between the amount (% by volume) of fine nitrides of not greater than 0.5 μm and the tensile strength as found for a steel of the present invention.

(a) Mean Austenite Grain Size is not Greater than 20 μm:

Generally, as the crystal grain size decreases, the strength, in particular the yield strength (0.2% proof stress) increases but the ductility and toughness conversely decrease. However, as shown in FIG. 10 and FIG. 11 to be described later herein, when the austenite grain size is not greater than 20 μm in the composition range of the steel of the present invention, it is possible to secure necessary levels of elongation and toughness and, in addition, to attain high levels of strength. The "mean grain size" means the average value of crystal grain sizes as obtained by the method of grain size determination defined in JIS G 0551.

(b) Fine Nitrides of not Greater than 0.1 μm are Dispersed in an Amount of not less than 0.005% by Volume:

When N is added in large amounts to austenitic stainless steels, nitrides such as CrN and $Cr_2N$ are formed. So long as these nitrides precipitate in a fine state of not greater than 0.1 μm, they contribute toward increasing the strength of the steels. However, the Cr nitrides formed in the steel, to which merely a large amount of N is added, are hexagonal and poor in coherency with the austenite matrix, as described above. Therefore, the Cr nitrides tend to aggregate and become coarse and, after coarsening, they cause decreases in ductility and toughness.

The coherency, so referred to above, is a matching ability between Cr nitrides and austenite due to the differences in the crystal structure and the lattice constant. When the structure and the lattice constant are identical, the coherency becomes best. Therefore, when utilizing nitrides in the steel of the present invention, it is desirable that nitrides in a fine state of not greater than 0.1 μm be precipitated and dispersed in an amount of not less than 0.005% by volume.

The nitride size is evaluated herein in terms of the maximum diameter after conversion of the sectional shapes of nitrides to equivalent circles.

(c) The Fine Nitrides of not Greater than 0.1 μm Contain not less than 10% by Mass of V Within Them:

When N is added in large amounts to the conventional austenitic stainless steels, the nitrides such as CrN and $Cr_2N$ generally occur in a most stable state. These nitrides are not good in the coherency with the matrix, so that they tend to aggregate and become coarse as mentioned above. However, as V is dissolved as a solid-solution in the nitrides, the lattice constants of the nitrides vary gradually, even when the Cr nitrides remain hexagonal, with the result that the coherency with the austenite matrix is improved; thus, V contributes to improvements in strength and toughness. For producing these effects, the content of V in the nitrides is desirably not less than 10% by mass.

(d) The Fine Nitrides of not Greater than 0.1 μm are Face-Centered Cubic in Crystal Structure:

When the Cr nitrides have the same face-centered cubic crystal structure as the austenite matrix, the nitrides precipitate coherently with the austenite matrix and will hardly aggregate to become coarse. Therefore, it is desirable that at least part of the Cr nitrides have the face-centered cubic crystal structure.

As shown in Example described hereinafter, the austenitic stainless steel of the present invention is not only high in strength but is also excellent in ductility and toughness. In addition, its hydrogen embrittlement susceptibility is low even in a high-pressure hydrogen environment. Therefore, this steel is very useful as a material for the manufacture of containers, piping, and accessory parts or devices for high-pressure hydrogen gas. The term "high-pressure hydrogen gas", as used herein, means hydrogen gas under a pressure of not lower than 50 MPa, in particular not lower than 70 MPa.

2. Containers and so Forth, According to the Present Invention

The containers and so forth according to the present invention include containers, piping, and accessory parts and devices belonging thereto, which are manufactured from the stainless steel mentioned above and to be used for high-pressure hydrogen gas. In cases where the containers and so forth contain one or more welded joints, the weld metal desirably has the chemical composition described hereinabove. Hereinafter, the components of weld metal, by which the welded joints are characterized, will be described.

C: not more than 0.04%

When C content exceeds 0.04%, carbides are formed and the ductility and toughness of the weld metal are thereby markedly decreased. Therefore, the C content is not higher than 0.04% and desirably is as low as possible. A more desirable content is not more than 0.03%, and the most desirable content is not more than 0.02%.

Si: not more than 1.0%

Si is an element necessary as a deoxidizer. However, it forms intermetallic compounds in the weld metal and thereby deteriorates the toughness. Therefore, its content should be not higher than 1.0% and is desirably as low as possible. A desirable Si content level is not higher than 0.5%, more desirably, not higher than 0.2%. The lower limit may be the impurity level.

Mn: 7 to 30%

Mn is effective as an element for increasing the solubility of N and thereby preventing N from being released during welding. For obtaining such effects, a content of not lower than 7% is required. On the other hand, when welding materials are manufactured, from the viewpoint of hot workability in the processing into rods or wires, its content is desirably low; hence the upper limit is set at 30%. A more desirable upper limit is 25%.

Cr: 15 to 22%

Cr is an element necessary for improving the corrosion resistance in a high-pressure gas environment. For obtaining such effect, a content of not less than 15% is required in the weld metal as well as the base metal. However, when Cr becomes excessive, such mechanical properties as toughness and workability may deteriorate, hence the upper limit is set at 22%.

Ni: 4 to 20%

Ni is an element necessary for stabilizing the austenite phase in the weld metal. For producing this effect, a content of not lower than 4% is necessary. However, the content of 20% is sufficient to obtain such an effect, and a higher content unfavorably causes an increase in welding material cost.

V: 0.05 to 1.0%

In the weld metal, V produces the following effects on the condition that Nieq and Creq satisfy the relationship [2] given hereinabove. Thus, within the range, in which the relationship given in [2] is satisfied, when the mode of solidification of the weld metal is such that primary crystals is δ ferrite phase and the austenite phase appears from the eutectic reaction in the middle and later stages of solidification, the concentration of V in the remaining liquid phase is inhibited. Therefore, V does not segregate among the primary crystal dendrite branches. As a result, V efficiently combines with N in the process of solidification to form fine VN, therefore, it becomes possible to prevent toughness deterioration. This effect becomes significant at a level of not lower than 0.05%. However, when it exists at an excessive level, exceeding 1.0%, the effect saturates and only the disadvantage of higher production cost becomes significant.

Mo: 0 to 3.0%

Mo is an element that is effective in improving the strength and corrosion resistance of the weld metal, and may be added according to need. When Mo is added at excessive levels, it segregates and causes a decrease in ductility. When Mo is added, its content is desirably not lower than 1.0%, but the upper content limit should be set at 3.0%.

N, 0.20 to 0.50%

N is necessary for securing the strength of the weld metal. N dissolves as a solid solution in the weld metal and contributes to strengthening and, at the same time, combines with V to form fine nitrides and thus contributes to precipitation hardening. At levels lower than 0.20%, these effects are weak. On the other hand, an excessive addition of N will bring about welding defects such as blowholes; hence the upper content limit is set at 0.50%.

Al: not more than 0.10%

Al is an element effective as a deoxidizing element. However it combines with N to form nitrides and thereby weakens the effects of the addition of N. Therefore, it is recommended that the Al content not be more than 0.10%. A desirable content is not more than 0.05%, more desirably not more than 0.02%. For sufficient deoxidizing, Al content of not lower than 0.005% is desirable.

Ti, Nb, Zr and Hf: 0 to 0.01% Respectively

These four elements form fine nitrides in the process of solidification of the weld metal and thus contribute to strength improvement. Therefore, they may be added according to need. When they are added at excessive levels, however, they may cause the formation of coarse nitrides, not only failing to contribute to strength improvement but also deteriorating the toughness. Therefore, when they are added, it is recommended that the content of each be not higher than 0.01%. When they are added, the content of each is desirably not lower than 0.001%.

P: not more than 0.030%

P is an unfavorable impurity deteriorating the toughness of the weld metal. Its content should not be more than 0.030% and is desirably as low as possible.

S: not more than 0.005%

S is a very harmful element segregating at grain boundaries in the weld metal and thereby weakening the bonding strength among grains and deteriorating the weldability, hence it is necessary to set an upper limit. Its content should not be more than 0.005%, and is desirably as low as possible.

The weld metal is required to satisfy the condition specified by the relationship [2]. The relationship [2] is the following:

$$-11 \leq Nieq - 1.1 \times Creq \leq -8 \quad [2]$$

where $$Nieq = Ni + 30 \times (C+N) - 0.5 \times Mn \text{ and}$$

$$Creq = Cr + Mo + 1.5 \times Si.$$

First, when $Nieq - 1.1 \times Creq \leq -8$, the solidification segregation of V is weakened and it becomes possible for fine VN to precipitate upon only post-welding heat treatment. This is because the solidification mode becomes such that primary crystals form δ ferrite phase and the austenite phase is formed by the eutectic reaction in the middle and later stages of solidification, so that the concentration of V in the remaining liquid phase and the segregation of V among dendrite branches can be prevented.

On the other hand, the low temperature toughness and hydrogen embrittlement resistance characteristics of the weld metal are improved by satisfying the condition $-11 \leq Nieq - 1.1 \times Creq$. When this condition is satisfied, the hydrogen cracking susceptibility after solidification and cooling of the weld metal decreases and, at the same time, the amount of δ ferrite, which is brittle at low temperatures, is reduced, whereby good low temperature toughness can be secured.

The above weld metal may contain at least one element selected from W and Ta in the above-mentioned first group elements, second group elements and third group elements. The effects of these elements and the grounds for restrictions on the contents thereof are as described above, referring to the stainless steel of the present invention.

Regarding the welded joints of the containers and so forth, according to the present invention, it is only necessary that the composition of the weld metal resulting from melting and mixing of the base metal and welding material should satisfy the requirements described above. Practically, it is necessary to select the welding material according to the composition of the base metal. The base metal dilution rate, which is defined as the proportion of the base metal composition in the composition of the weld metal, depends on the method of welding.

In the case of TIG and MIG welding, it is about 5 to 30% and, in the case of submerged arc welding, it is about 40 to 60%. Therefore, when the base metal composition is given, the composition of the welding material can be selected by making calculations so that the weld metal composition may fall within the ranges mentioned above, considering the base metal dilution rate. After welding, aging heat treatment is carried out at 550 to 700° C. for about 30 to 100 hours, thereby high-strength welded joints with a tensile strength of not lower than 800 MPa can be obtained.

EXAMPLES

The following examples illustrate the effects of the present invention more specifically.

Example 1

Chemical compositions (% by mass) of austenitic stainless steels, according to the present invention are shown in Table 1, and those of conventional steels and steels for comparison are shown in Table 2. For indicating whether each chemical composition satisfies the relationship [1] or not, the values of "Pmcn=2.5Cr+3.4Mn−300N" are also given. When Pmcn is not larger than 0 (zero), the relationship [1], namely "2.5Cr+3.4Mn≦300N", is satisfied.

The steels having the respective compositions specified in Table 1 and Table 2 were melted by using a 150-kg vacuum induction-melting furnace, and made into ingots. The ingots were then soaked at 1,200° C. for 4 hours, and hot-forged at 1,000° C. or above to produce plates, 25 mm in thickness and 100 mm in width. The plates were then subjected to a solution treatment for 1 hour at 1,000° C., followed by water-cooling. The plates were used for test specimens.

FIG. 1 is an optical photomicrograph of the steel of the present invention (steel No. 1 in Table 1).

Figure 2:
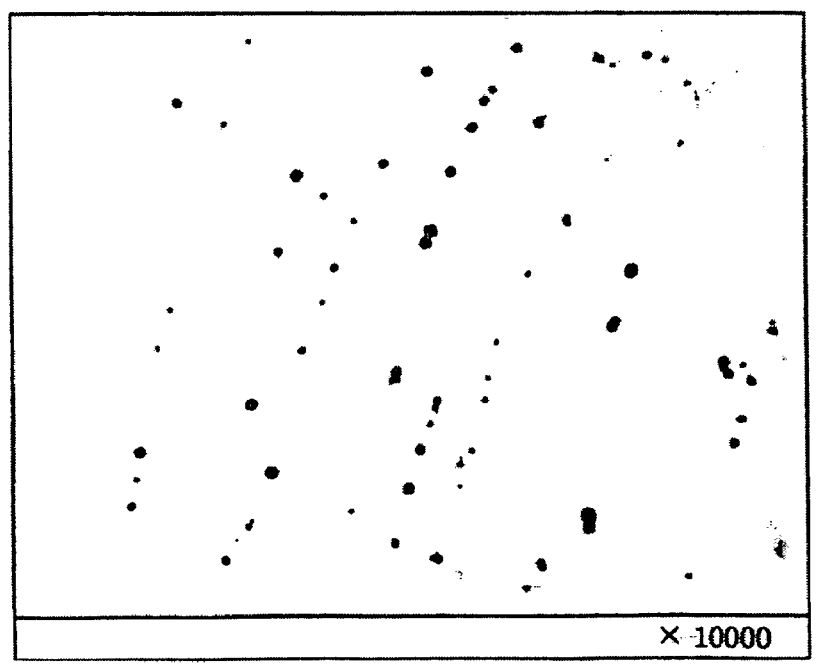
FIG. 2 is an electron photomicrograph illustrating the state of dispersion of fine nitrides precipitated in the austenite matrix of the steel of the present invention.
Figure 3:
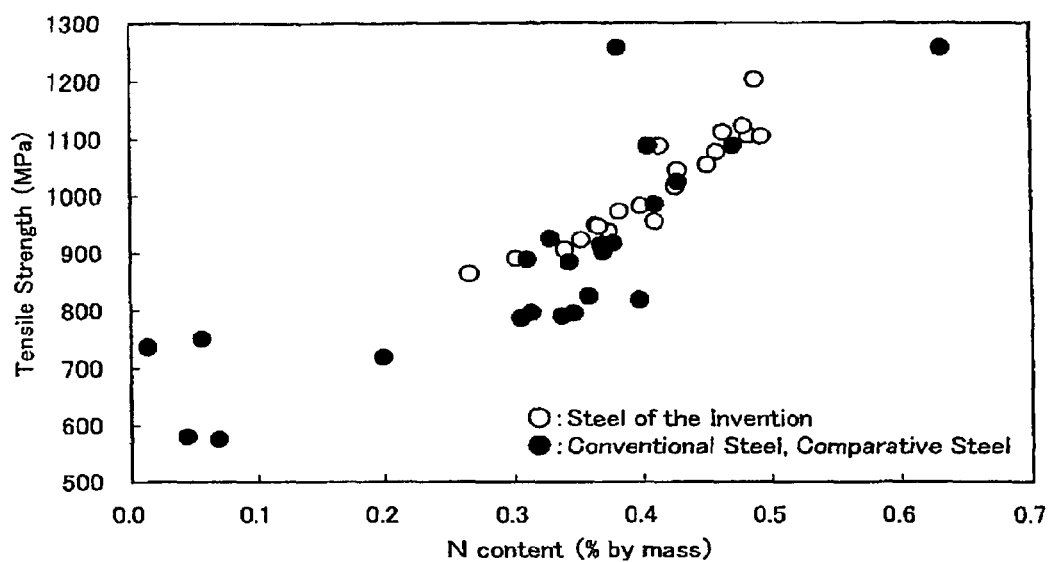
FIG. 3 is a is a graphic representation of the relations between the N content and the tensile strength (TS) as found for the steels of the present invention, conventional steels and steels for comparison.

FIG. 2 is an electron photomicrograph illustrating the state of dispersion of the fine nitrides precipitated in the austenite matrix of the steel of the present invention (steel No. 7 in Table 1).

The chemical composition (the composition being given in proportions of metal components) of the fine nitrides of not greater than 0.1 um in the steel of the present invention (steel No. 7 in Table 1) was measure by an X-ray spectrum.

The steels of the present invention all showed an austenitic single-phase structure as shown in FIG. 1 or a structure containing dispersed nitride precipitates (black spots in the figure) in the austenite matrix, as shown in FIG. 2. In the measurement by the above-mentioned X-ray spectrum. V amounted to not less than 10% by mass in the metal composition of the nitride precipitates.

Specimens for tensile test (diameter: 4 mm, GL: 20 mm), specimens for tensile test in a hydrogen gas environment (diameter: 2.54 mm, GL: 30 mm), and 2V-notched specimens for Charpy impact test (10 mm×10 mm×55 mm) were cut out from the plate mentioned above. The tensile test was carried out at room temperature, and Charpy impact test at 0° C. The tensile test in a hydrogen gas environment was carried out at room temperature in a high-pressure (75 MPa) hydrogen gas environment at a strain rate of $1\times10^{-4}$/S. Comparisons were made in performance characteristics with the conventional steels and steels for comparison. The results are shown in Table 3, Table 4 and FIG. 4 to FIG. 11.

TABLE 1

| | | Chemical Composition (mass %, balance: Fe and impurities) | | | | | | | | | | | | | |
|---|---|---|---|---|---|---|---|---|---|---|---|---|---|---|---|
| Class | No. | C | Si | Mn | P | S | Ni | Cr | V | sol.Al | N | Ti | Zr | Hf | Pmcn | Others |
| Steel of | 1 | 0.021 | 0.29 | 10.01 | <0.001 | 0.001 | 9.95 | 17.95 | 0.10 | 0.006 | 0.265 | — | — | — | −0.6 | |
| the | 2 | 0.018 | 0.25 | 15.30 | <0.001 | 0.002 | 5.97 | 17.22 | 0.01 | 0.040 | 0.451 | 0.002 | — | — | −40.2 | Nd: 0.023, Mo: 2.02 |
| Invention | 3 | 0.015 | 0.31 | 12.02 | 0.018 | 0.002 | 8.86 | 21.27 | 0.33 | 0.037 | 0.483 | — | — | — | −50.9 | Mg: 0.0025 |
| | 4 | 0.033 | 0.11 | 8.23 | 0.025 | 0.003 | 11.83 | 18.89 | 0.35 | 0.003 | 0.301 | 0.001 | — | — | −15.1 | Nd: 0.006 |
| | 5 | 0.016 | 0.49 | 21.24 | <0.001 | 0.001 | 10.72 | 17.53 | 0.57 | 0.005 | 0.428 | 0.005 | 0.002 | — | −12.4 | Y: 0.032, W: 4.16 |
| | 6 | 0.008 | 0.33 | 11.63 | 0.019 | 0.003 | 12.44 | 18.20 | 0.41 | 0.012 | 0.364 | — | — | — | −24.2 | Ca: 0.0023, Sm: 0.026 |
| | 7 | 0.014 | 0.30 | 9.89 | 0.022 | 0.002 | 12.16 | 21.58 | 0.38 | 0.051 | 0.382 | — | 0.001 | — | −27.0 | Mo: 2.01 |
| | 8 | 0.027 | 0.26 | 10.04 | 0.021 | <0.001 | 11.79 | 17.93 | 0.10 | 0.048 | 0.399 | — | 0.000 | — | −40.7 | Nd: 0.074, Y: 0.02 |
| | 9 | 0.013 | 0.22 | 15.76 | 0.022 | 0.002 | 6.35 | 19.34 | 0.44 | 0.042 | 0.426 | 0.002 | 0.001 | 0.001 | −25.9 | Nb: 0.03, Nd: 0.05 |
| | 10 | 0.011 | 0.41 | 14.88 | 0.015 | <0.001 | 8.51 | 18.81 | 0.09 | 0.057 | 0.410 | 0.002 | — | — | −25.4 | Mo: 1.56, Co: 3.12, La: 0.02 |
| | 11 | 0.019 | 0.30 | 15.02 | 0.016 | <0.001 | 13.56 | 18.43 | 0.11 | 0.003 | 0.374 | — | — | — | −15.1 | Co: 3.54, B: 0.0043, Ce: 0.05 |
| | 12 | 0.012 | 0.06 | 10.06 | 0.015 | 0.001 | 12.48 | 17.94 | 0.38 | 0.009 | 0.366 | — | 0.001 | — | −30.7 | Mg: 0.0025, Cu: 0.51, Nd: 0.13 |
| | 13 | 0.016 | 0.47 | 9.77 | 0.018 | 0.002 | 10.63 | 17.87 | 0.38 | 0.012 | 0.352 | 0.001 | — | — | −27.7 | Nd: 0.23, B: 0.0025 |
| | 14 | 0.009 | 0.14 | 10.23 | 0.009 | 0.003 | 11.24 | 18.52 | 0.39 | 0.014 | 0.339 | 0.006 | — | 0.001 | −20.6 | Cu: 0.8 |
| | 15 | 0.012 | 0.08 | 14.45 | 0.005 | 0.002 | 12.87 | 16.88 | 0.41 | 0.008 | 0.414 | — | — | — | −32.9 | Nd: 0.03, Ta: 0.04 |
| | 16 | 0.015 | 0.55 | 15.57 | 0.008 | 0.002 | 11.59 | 18.29 | 0.37 | 0.083 | 0.479 | 0.003 | — | — | −45.0 | |
| | 17 | 0.022 | 0.28 | 15.33 | 0.009 | 0.002 | 7.76 | 17.75 | 0.20 | 0.033 | 0.458 | — | 0.001 | — | −40.9 | Mo: 1.55, B: 0.0025 |
| | 18 | 0.003 | 0.44 | 16.24 | 0.023 | 0.002 | 8.52 | 18.93 | 0.19 | 0.024 | 0.493 | — | — | — | −45.4 | |
| | 19 | 0.015 | 0.32 | 16.03 | 0.003 | 0.001 | 9.04 | 18.87 | 0.22 | 0.008 | 0.488 | — | — | — | −44.7 | Pr: 0.005 |
| | 20 | 0.017 | 0.15 | 17.83 | 0.008 | 0.002 | 10.56 | 18.25 | 0.41 | 0.003 | 0.463 | 0.001 | — | — | −32.7 | |

Note:
"Pmcn" means the calculated value of "2.5Cr + 3.4Mn − 300N".

TABLE 2

| Class | No. | C | Si | Mn | P | S | Ni | Cr | V | sol.Al | N | Ti | Zr | Hf | Pmcn | Others |
|---|---|---|---|---|---|---|---|---|---|---|---|---|---|---|---|---|
| Con- | A | 0.041* | 0.34 | 1.83* | 0.025 | 0.002 | 12.25 | 17.88 | —* | 0.012 | 0.043 | — | — | — | 37.2* | |
| ven- | B | 0.026 | 0.28 | 1.76* | 0.021 | 0.001 | 7.96 | 18.23 | —* | 0.008 | 0.068 | — | — | — | 30.5* | |
| tional | C | 0.090* | 0.31 | 0.75* | 0.019 | 0.001 | 20.46* | 24.95* | —* | 0.009 | 0.055 | — | — | — | 48.1* | |
| Steel | D | 0.011 | 0.35 | 0.58* | 0.015 | 0.001 | 8.25 | 18.11 | —* | 0.011 | 0.013 | — | — | — | 43.1* | Nb: |
| Steel | G | 0.052* | 0.32 | 10.88 | 0.021 | 0.001 | 12.05 | 18.66 | 0.15 | 0.078 | 0.313 | — | 0.001 | — | −14.7 | 0.12 |
| for | H | 0.018 | 1.25* | 10.22 | 0.020 | 0.002 | 11.14 | 18.52 | 0.16 | 0.055 | 0.358 | — | — | — | −30.4 | |
| Com- | I | 0.025 | 0.35 | 3.21* | 0.009 | 0.002 | 13.87 | 17.99 | 0.14 | 0.081 | 0.337 | 0.001 | — | — | −46.5 | |
| par- | J | 0.022 | 0.36 | 33.46* | 0.022 | 0.003 | 13.36 | 18.06 | 0.15 | 0.026 | 0.369 | — | — | 0.001 | 34.8* | |
| ison | K | 0.019 | 0.33 | 11.55 | 0.029 | 0.001 | 3.87* | 18.54 | 0.15 | 0.033 | 0.343 | — | 0.001 | 0.001 | −21.9 | |
| | L | 0.009 | 0.34 | 10.76 | 0.022 | 0.001 | 8.84 | 13.59* | 0.21 | 0.025 | 0.305 | — | 0.001 | — | −25.2 | |
| | M | 0.035 | 0.38 | 10.32 | 0.027 | 0.001 | 8.96 | 23.88* | 0.22 | 0.018 | 0.377 | — | — | 0.001 | −22.4 | |
| | N | 0.007 | 0.33 | 10.24 | 0.026 | 0.001 | 9.55 | 18.35 | 1.20* | 0.019 | 0.346 | 0.001 | — | — | −27.2 | |
| | O | 0.026 | 0.39 | 10.54 | 0.028 | 0.002 | 8.65 | 20.83 | 0.21 | 0.180* | 0.368 | — | 0.001 | — | −26.7 | |
| | P | 0.025 | 0.44 | 11.78 | 0.025 | 0.002 | 8.12 | 18.86 | 0.21 | 0.035 | 0.199* | — | — | 0.001 | 22.8* | |
| | Q | 0.020 | 0.41 | 10.98 | 0.026 | 0.002 | 7.59 | 19.04 | 0.21 | 0.033 | 0.632* | — | — | — | −109.1 | |
| | R | 0.024 | 0.35 | 10.06 | 0.020 | 0.001 | 8.23 | 18.58 | 0.53 | 0.028 | 0.471 | 0.025* | 0.001 | 0.001 | −64.7 | |
| | S | 0.023 | 0.28 | 13.35 | 0.021 | 0.002 | 8.51 | 17.68 | 0.53 | 0.024 | 0.428 | 0.001 | 0.033* | — | −44.2 | |
| | T | 0.016 | 0.22 | 8.88 | 0.026 | 0.002 | 7.78 | 17.47 | 0.52 | 0.021 | 0.410 | — | 0.001 | 0.028* | −52.7 | |
| | U | 0.023 | 0.42 | 27.52 | 0.021 | 0.001 | 6.55 | 17.28 | 0.46 | 0.087 | 0.398 | 0.002 | 0.004 | 0.004 | 6.4* | |
| | V | 0.025 | 0.35 | 23.38 | 0.020 | 0.001 | 6.43 | 21.54 | 0.45 | 0.056 | 0.381 | 0.000 | 0.002 | 0.006 | 9.74* | |
| | W | 0.018 | 0.38 | 25.01 | 0.026 | 0.001 | 7.11 | 20.89 | 0.51 | 0.053 | 0.310 | 0.002 | 0.000 | 0.000 | 34.3* | |
| | X | 0.026 | 0.21 | 28.86 | 0.028 | 0.002 | 5.95 | 21.74 | 0.48 | 0.071 | 0.328 | 0.000 | 0.000 | 0.000 | 42.5* | |
| | Y | 0.017 | 0.30 | 26.95 | 0.025 | 0.001 | 6.47 | 20.22 | 0.39 | 0.066 | 0.405 | 0.005 | 0.000 | 0.000 | 9.9* | |

Note:
The mark "*" means that the content is outside the range defined in the present invention.
"Pmcn" means the calculated value of "2.5Cr + 3.4Mn − 300N".

TABLE 3

Results of Tensile Test at Room Temperature

| Class | No. | Tensile Strength TS (MPa) | Yeild Strength YS (MPa) | Elongation (%) | Toughness vEo (J) | Hydrogen Embrittlement Susceptibility |
|---|---|---|---|---|---|---|
| Steel of the | 1 | 863 | 534 | 40.0 | 160 | 0.99 |
| Invention | 2 | 1054 | 701 | 36.7 | 78 | 1.02 |
| | 3 | 1106 | 755 | 36.7 | 81 | 0.98 |
| | 4 | 890 | 612 | 45.7 | 136 | 0.95 |
| | 5 | 1045 | 778 | 32.3 | 62 | 0.89 |
| | 6 | 948 | 597 | 43.3 | 108 | 0.95 |
| | 7 | 973 | 678 | 39.7 | 115 | 1.00 |
| | 8 | 982 | 772 | 38.3 | 123 | 0.92 |
| | 9 | 1016 | 761 | 36.3 | 74 | 0.88 |
| | 10 | 955 | 676 | 37.3 | 80 | 0.96 |
| | 11 | 938 | 614 | 39.3 | 88 | 0.97 |
| | 12 | 946 | 689 | 38.3 | 99 | 0.99 |
| | 13 | 923 | 628 | 41.3 | 103 | 1.03 |
| | 14 | 906 | 561 | 39.3 | 92 | 0.92 |
| | 15 | 1087 | 727 | 35.7 | 76 | 0.99 |
| | 16 | 1122 | 763 | 34.7 | 78 | 1.05 |
| | 17 | 1077 | 782 | 35.3 | 81 | 0.96 |
| | 18 | 1104 | 733 | 31.7 | 60 | 0.94 |
| | 19 | 1203 | 802 | 32.3 | 63 | 0.95 |
| | Note: | 1112 | 776 | 34.0 | 71 | 0.86 |

Note:
"Hydrogen Embrittlement Susceptibility" means the calculated value of "(tensile elongation in hydrogen gas environment)/(tensile elongation in air)".

TABLE 4

Results of Tensile Test at Room Temperature

| Class | No. | Tensile Strength TS (MPa) | Yield Strength YS (MPa) | Elongation (%) | Toughness vEo (J) | Hydrogen Embrittlement Susceptibility |
|---|---|---|---|---|---|---|
| Conventional | A | 580** | 252** | 62.3 | 123 | 0.83 |
| Steel | B | 576** | 243** | 52.3 | 142 | 0.95 |
| | C | 751** | 350** | 45.3 | 61 | 0.91 |
| | D | 736** | 323** | 32.3 | 48** | 0.75** |

TABLE 4-continued

| | | Results of Tensile Test at Room Temperature | | | | |
|---|---|---|---|---|---|---|
| Class | No. | Tensile Strength TS (MPa) | Yield Strength YS (MPa) | Elongation (%) | Toughness vEo (J) | Hydrogen Embrittlement Susceptibility |
| Steel for Comparision | G | 796** | 512 | 32.3 | 23** | 0.78** |
| | H | 824 | 583 | 28.7** | 28** | 0.85 |
| | I | 789** | 525 | 18.0** | 33** | 0.92 |
| | J | 902 | 622 | 30.3 | 38** | 0.96 |
| | K | 884 | 595 | 30.7 | 35** | 0.75** |
| | L | 786** | 525 | 31.3 | 48** | 0.96 |
| | M | 917 | 733 | 24.7** | 34** | 0.88 |
| | N | 795** | 507 | 27.0** | 36** | 0.85 |
| | O | 914 | 628 | 27.7** | 26** | 0.77** |
| | P | 718** | 383** | 31.7 | 47** | 0.86 |
| | Q | 1257 | 833 | 12.3** | 13** | 0.91 |
| | R | 1088 | 814 | 24.3** | 16** | 0.90 |
| | S | 1025 | 739 | 27.7** | 22** | 0.85 |
| | T | 985 | 718 | 27.7** | 20** | 0.86 |
| | U | 818 | 483 | 28.7** | 37** | 0.86 |
| | V | 1257 | 833 | 12.3** | 13** | 0.61** |
| | W | 888 | 714 | 14.0** | 24** | 0.70** |
| | X | 925 | 739 | 13.7** | 16** | 0.72** |
| | Y | 1087 | 778 | 17.7** | 20** | 0.76** |

Note:
The mark "**" means inferiority in performance.
"Hydrogen Embrittlement Susceptibility" means the calculated value of "(tensile elongation in hydrogen gas environment)/(tensile elongation in air)".

For the steels No. 1 to 20 of the present invention, the TS (tensile strength) at room temperature is 800 MPa or higher, the YS (yield strength) is 400 MPa or higher, and the elongation is 30% or higher. In addition, the toughness (vEo: absorbed energy) is 50 J or higher. Thus, they are very high in strength and high in ductility and in toughness. Further, the hydrogen embrittlement susceptibility, which was evaluated based on the ductility in the tensile test in a hydrogen gas environment, is very small.

The steels for comparison, namely Nos. G to Y, on the contrary, do not satisfy the range requirements in accordance with the present invention with respect to the content of at least one component or the Pmcn value. These are not satisfactory in any one of the features including strength, ductility, toughness and hydrogen embrittlement resistance.

Figure 4:
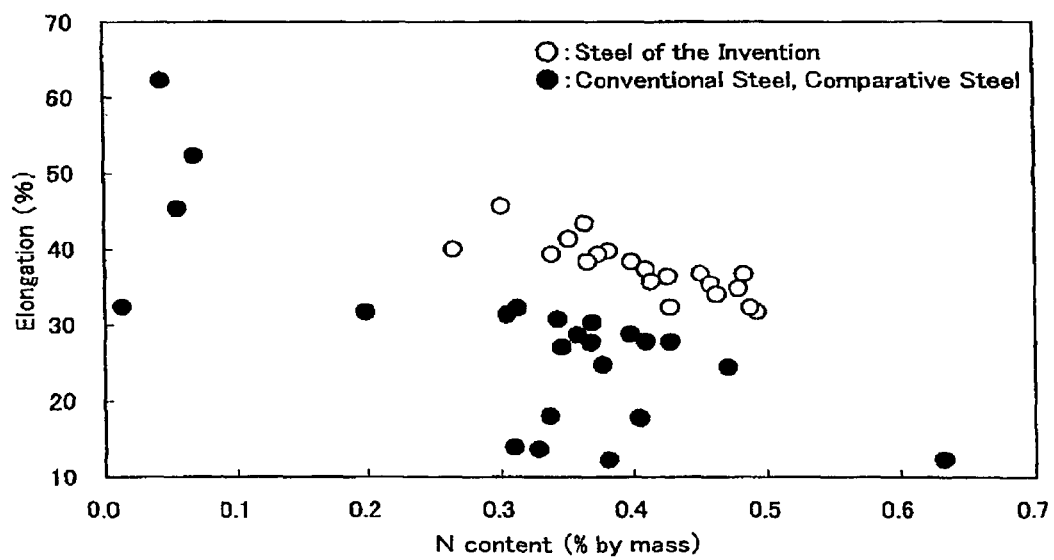
FIG. 4 is a graphic representation of the relations between the N content and the ductility (elongation) as found for the steels of the present invention, conventional steels and steels for comparison.
Figure 5:
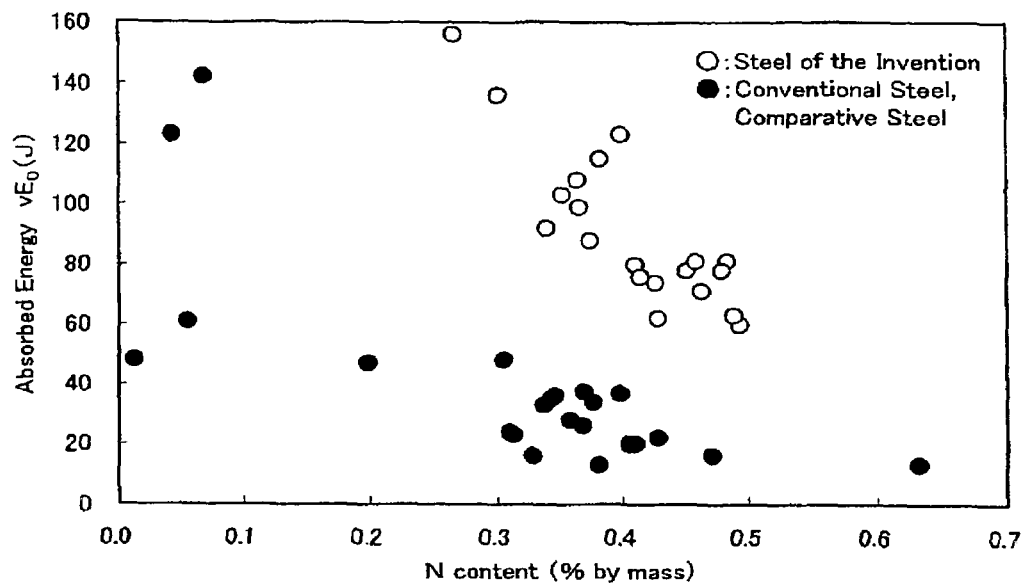
FIG. 5 is a graphic representation of the relations between the N content and the toughness (Charpy absorbed energy) as found for the steels of the present invention, conventional steels and steels for comparison.
Figure 6:
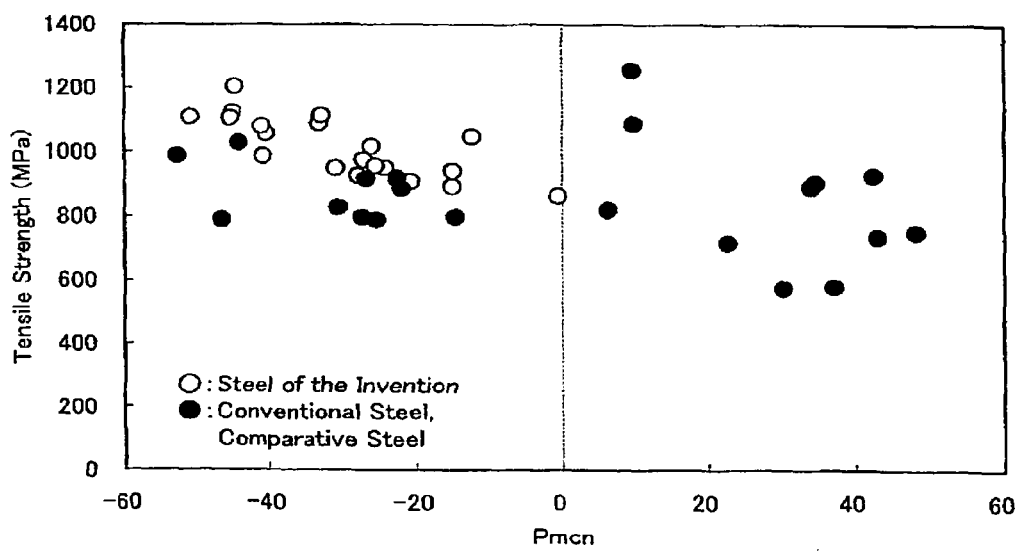
FIG. 6 is a graphic representation of the relations between the Pmcn2 (5Cr+3.4 Mn−500N) and the tensile strength (TS) as found for the steels of the present invention, conventional steels and steels for comparison.
Figure 9:
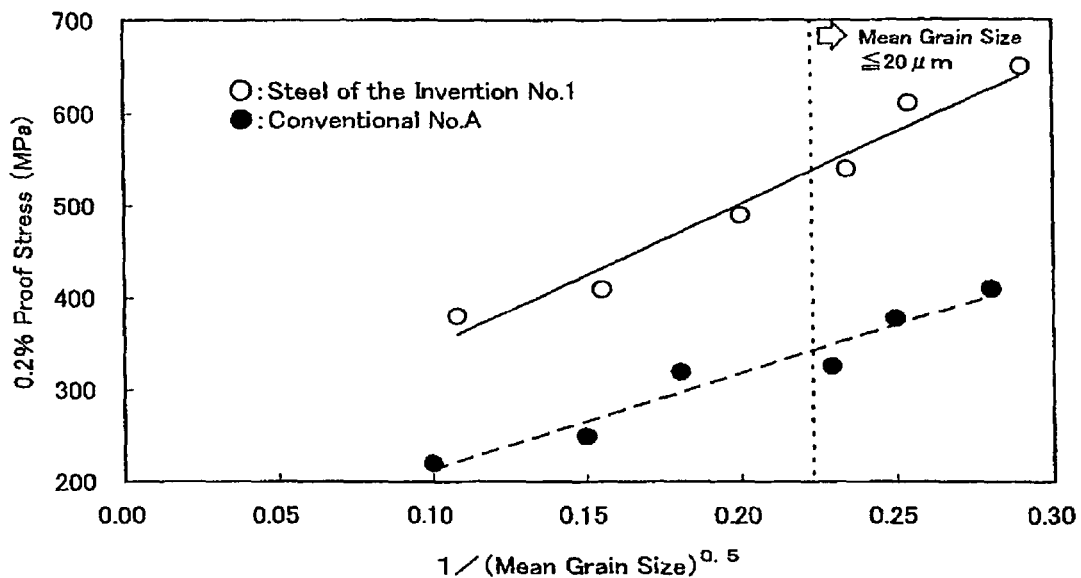
FIG. 9 is a graphic representation of the relations between "1/(mean grain diameter)$^{0.5}$" and the proof stress as found for a steel of the present invention and a conventional steel.

As shown in FIG. 4 to FIG. 6, with the increasing addition level of N, the strength increases almost uniformly for all the steels of the present invention, the conventional steels and the steels for comparison, whereas the steels of the invention are significantly superior in ductility (elongation) and toughness (absorbed energy). Further, from the relation between the Pmcn and the tensile strength, as shown in FIG. 7, and from the relation between the Pmcn and the elongation, as shown in FIG. 8, it is evident that high strength and good ductility can be obtained when the Pmcn is not larger than 0 (zero), namely the relationship [1] is satisfied. This fact is evident also from the relation between strength and ductility (elongation), as shown in FIG. 9.

In FIG. 10 and FIG. 11, comparisons were made, between the steel No. 1 of the present invention and the conventional steel No. A, with respect to the relation between the austenite grain size and the yield strength or ductility (elongation) by varying the solid solution treatment temperature in a range from 950° C. to 1,100° C. after hot working. With the steel of the present invention, the yield strength was improved as the grain size became finer while the ductility (elongation) did not decrease very much. When the mean grain size was 20 μm or finer, the steel acquired a very high level of strength, exceeding 500 MPa, as expressed in terms of yield strength. On the other hand, the decrease in ductility was significant with the conventional steel, although the strength thereof increased as the grain size became finer.

Figure 12:
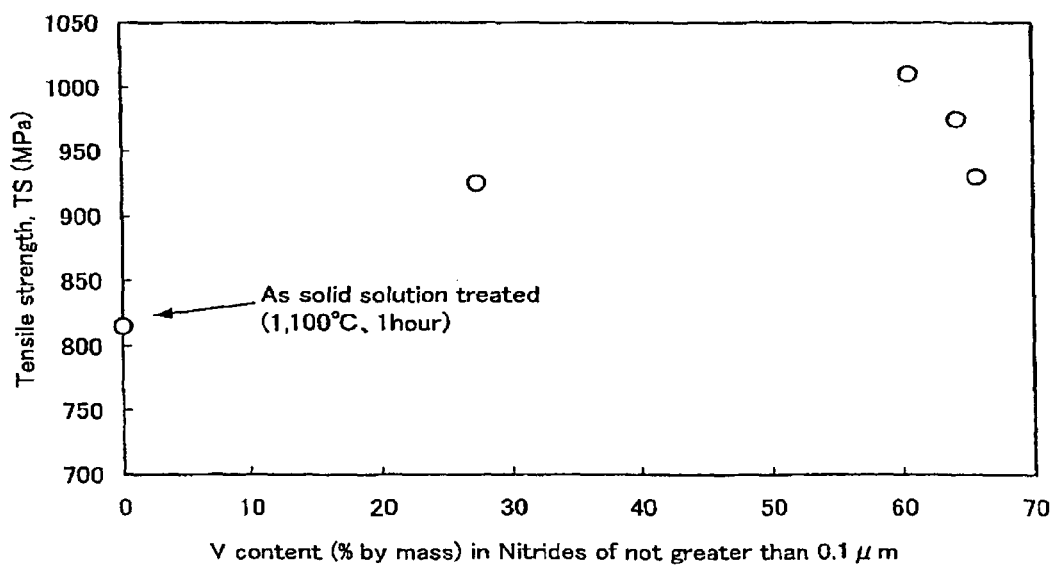
FIG. 12 is a graphic representation of the relation between the V concentration (metal composition in nitrides; % by mass) in fine nitrides of not greater than 0.5 μm and the tensile strength as found for a steel of the present invention.
Figure 13:
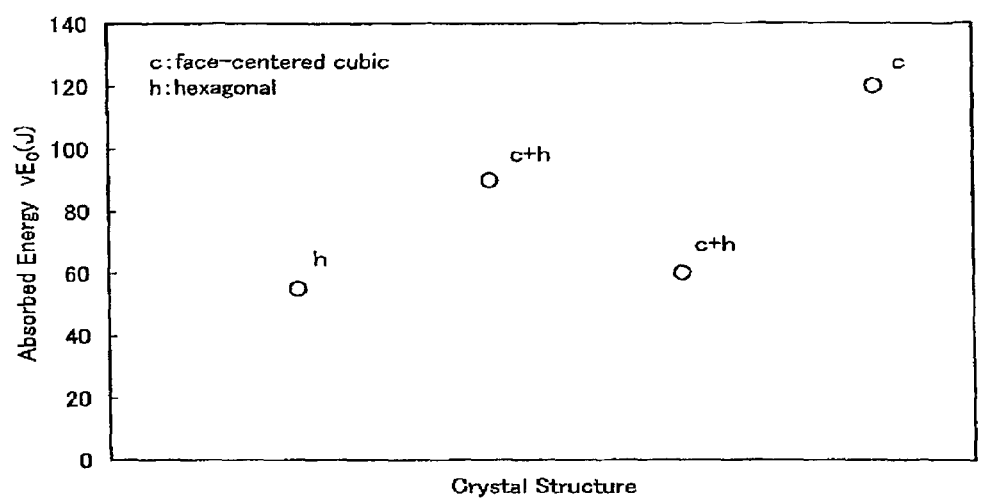
FIG. 13 is a graphic representation of the relation between nitride crystal structure and the toughness as found for a steel of the present invention.
Figure 14:
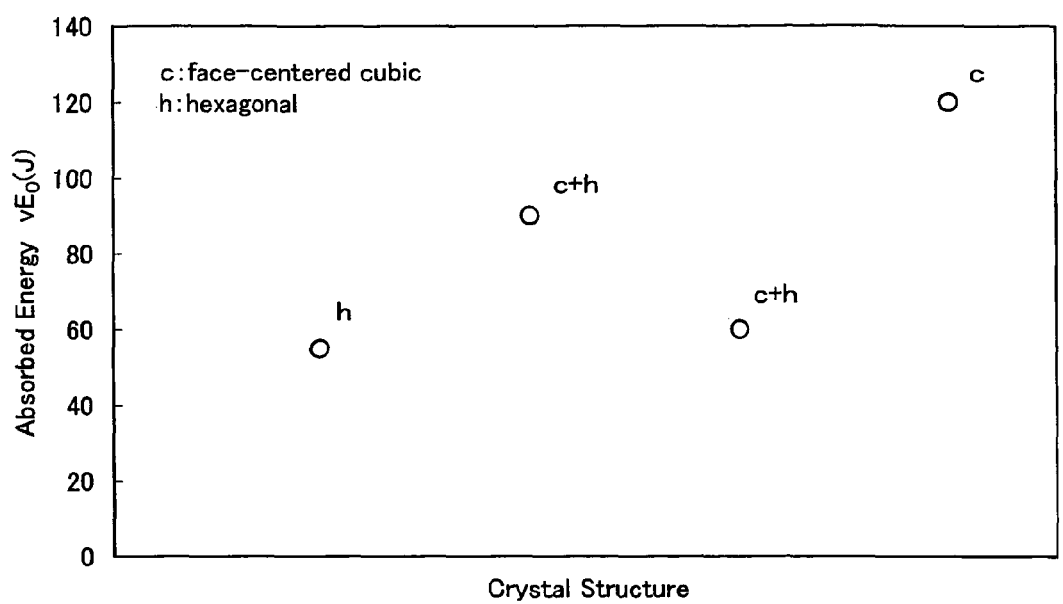

FIG. 12 to FIG. 14 show the results of measurements of the crystal structure of nitride precipitates, the amount (% by volume) of the fine nitrides of not greater than 0.1 μm and the V concentration therein (metal composition in nitrides; % by mass), after a solid solution treatment of the steel No. 6 of the present invention by 1 hour of heating at 1,100° C., followed by water cooling, further followed by 3 hours of heat treatment at a temperature of 700° C. to 1000° C., and of further comparison with respect to the strength (tensile strength: TS) and toughness (absorbed energy: vEo).

As shown in the figures, it is possible to further improve either the strength or the toughness by employing the metallurgical structure defined herein.

Example 2

Base metals M1 and M2, having the respective chemical compositions specified in Table 5, were melted in a 50-kg vacuum high-frequency furnace and then forged to produce 25-mm-thick plates, which were subjected to heat treatment by maintaining at 1,000° C. for 1 hour, followed by water cooling. The plates were used for test specimens. Similarly, alloys W1, W2, Y1 and Y2, having the respective chemical composition specified in Table 5, were melted in a 50-kg vacuum high-frequency furnace and then worked into wires with an outer diameter of 2 mm to produce welding materials. For weldability evaluation, welded joints were made in the manner mentioned below and subjected to evaluation tests.

The plates of 25 mm thick, 100 mm wide and 200 mm long were provided with a V groove with an angle of 20 degrees on one side. Pairs of such plates identical in composition were butted against each other, and welded joints were produced by multilayer welding in the grooves by the TIG welding using welding materials shown in Table 5, in combinations with the base metals as shown in Table 6 and Table 7. The welding conditions were as follows:

Welding current; 130 A,
Welding voltage; 12 V,
Welding speed; 15 cm/min.

Tensile test specimens, having a parallel portion with an outer diameter of 6 mm and a length of 30 mm, and having the weld metal in the middle of the parallel portion, and test specimens for a tensile test in a hydrogen gas environment, having a parallel portion with an outer diameter of 2.54 mm and a length of 30 mm, and having the weld metal in the middle of the parallel portion were respectively taken from the above welded joints in the direction perpendicular to the weld line. Further, Charpy impact test specimens of "10×10× 55 mm", having a 2-mm-deep V notch in the middle of the weld metal, were also taken in the direction perpendicular to the weld line.

The tensile test was carried out at room temperature, and the Charpy impact testing at −60° C., and the welded joints were then evaluated for strength and toughness. The tensile tests in a hydrogen gas environment were carried out at room temperature in a high-pressure, 75 MPa, hydrogen gas environment at a strain rate of $1\times10^{-4}$/s.

In evaluating the results, the tensile strength was judged to be successful when it was not lower than 800 MPa, the toughness to be successful when the Charpy absorbed energy was not lower than 20 J, and the hydrogen embrittlement resistance to be successful when the ratio of the elongation at rupture in the tensile test in the hydrogen gas environment to that in the tensile test in the air was not lower than 0.8. The results are shown in Table 7, wherein the mark "○" means "successful".

TABLE 7

| | | Base Metal | Welding Material | Tensile Strength | Toughness | Hydrogen Embrittlement Resistance |
|---|---|---|---|---|---|---|
| Example of the Invention | A1 | M1 | W1 | ○ | ○ | ○ |
| | A2 | M1 | W2 | ○ | ○ | ○ |
| | A3 | M1 | W3 | ○ | ○ | ○ |
| | A4 | M2 | W4 | ○ | ○ | ○ |
| Comparative Example | B1 | M1 | Y1 | ○ | X | X |
| | B2 | M1 | Y2 | X | X | X |

As is evident from Table 7, the joints A1 to A4, in which the weld metal meets the requirement of the present invention, are above the criteria given hereinabove in all the aspects of tensile strength, toughness and Charpy absorbed energy. As for the hydrogen embrittlement resistance, the ratios of the elongation at rupture in the tensile test in the hydrogen gas environment to that in tensile test in the air were not lower than 0.8. Thus, these joints not only have high strength but also show superior toughness and hydrogen embrittlement resistance.

On the contrary, the joints B1 and B2, in which the relationship [2] given hereinabove, is not satisfied, even though the contents of the respective elements are within the respective ranges defined herein, did not acquire good toughness or hydrogen embrittlement resistance, while they have high strength, since, in the most important late stage of solidification other nuclei for solidification appear from the liquid phase and other solid phase grows around those nuclei.

TABLE 5

Chemical Composition (mass %, balance: Fe and impurities)

| | | C | Si | Mn | P | S | Ni | Cr | V | sol.Al | N | Ti | Others |
|---|---|---|---|---|---|---|---|---|---|---|---|---|---|
| Base Metal | M1 | 0.024 | 0.32 | 10.20 | 0.017 | 0.001 | 8.75 | 18.3 | 0.12 | 0.01 | 0.27 | 0.01 | Mo: 2.32 |
| | M2 | 0.018 | 0.25 | 9.28 | 0.009 | 0.001 | 19.40 | 21.8 | 0.23 | 0.02 | 0.25 | 0.01 | |
| Welding Material | W1 | 0.018 | 0.18 | 7.53 | 0.016 | 0.003 | 6.25 | 20.1 | 0.32 | — | 0.28 | — | |
| | W2 | 0.013 | 0.24 | 8.25 | 0.018 | 0.001 | 4.26 | 17.2 | 0.48 | — | 0.35 | — | Mo: 2.19 |
| | W3 | 0.015 | 0.24 | 8.22 | 0.017 | 0.001 | 5.21 | 18.2 | 0.47 | — | 0.35 | — | Mo: 2.04, Cu: 2.8 |
| | W4 | 0.013 | 0.24 | 8.65 | 0.018 | 0.001 | 5.98 | 18.9 | 0.42 | — | 0.33 | — | Mo: 2.28, La: 0.008 |
| | Y1 | 0.026 | 0.35 | 8.35 | 0.018 | 0.003 | 8.58 | 18.6 | 0.35 | — | 0.33 | 0.12 | |
| | Y2 | 0.025 | 0.64 | 9.27 | 0.019 | 0.003 | 4.82 | 20.4 | 0.51 | — | 0.25 | — | |

TABLE 6

| | | Base Metal | Welding Material | Chemical Composition (mass %, balance: Fe and impurities) | | | | | | | | | | | | (a) | (b) |
|---|---|---|---|---|---|---|---|---|---|---|---|---|---|---|---|---|---|
| | | | | C | Si | Mn | P | S | Ni | Cr | V | sol.Al | N | Ti | Others | | |
| Example of the Invention | A1 | M1 | W1 | 0.019 | 0.2 | 7.92 | 0.016 | 0.003 | 6.62 | 19.8 | 0.29 | 0.001 | 0.28 | 0.001 | Mo: 034 | 2.09 | −0.91 |
| | A2 | M1 | W2 | 0.015 | 0.25 | 8.54 | 0.018 | 0.001 | 4.92 | 16.5 | 0.43 | 0.001 | 0.34 | 0.001 | Mo: 2.21 | 2.13 | −0.87 |
| | A3 | M1 | W3 | 0.016 | 0.25 | 8.51 | 0.017 | 0.001 | 5.74 | 18.2 | 0.42 | 0.001 | 0.35 | — | Mo: 2.08, Cu: 2.5 | 2.28 | −0.72 |
| | A4 | M2 | W4 | 0.014 | 0.24 | 8.74 | 0.016 | 0.001 | 7.89 | 19.3 | 0.39 | 0.006 | 0.28 | — | Mo: 1.96, La: 0.006 | 2.04 | −0.96 |
| Comparative Example | B1 | M1 | Y1 | 0.026 | 0.35 | 8.62 | 0.018 | 0.003 | 8.60 | 18.6 | 0.32 | 0.001 | 0.32 | 0.104 | Mo: 0.34 | 6.26 | 3.26 |
| | B2 | M1 | Y2 | 0.025 | 0.59 | 9.41 | 0.019 | 0.003 | 5.40 | 20.0 | 0.45 | 0.001 | 0.25 | 0.001 | Mo: 034 | −0.27 | −3.27 |

Note:
"(a)" means the calculated value of "Nieq − 1.1Creq + 11", and
"(b)" means the calculated value of "Nieq − 1.1Creq + 8".

INDUSTRIAL APPLICABILITY

The austenitic stainless steel of the present invention has superior mechanical properties and corrosion resistance, for instance, hydrogen cracking resistance. This steel is very useful as a material for containers or devices for handling high-pressure hydrogen gas, mainly cylinders for fuel cell-powered vehicles, hydrogen storage vessels for hydrogen gas stations or the like.

The containers and so forth, according to the invention are suited for use as piping, containers and the like for high-pressure hydrogen gas, since even when they have a welded joint or joints, the weld metal is excellent in low temperature toughness and the hydrogen embrittlement resistance and high in strength.

The invention claimed is:

1. A stainless steel for high-pressure hydrogen gas characterized in that:
   (a) the steel consists of, by mass %, C: not more than 0.04%, Si: not more than 1.0%, Mn: 7 to 30%, Cr: 15 to 22%, Ni: 5 to 20%, V: 0.001 to 0.57%, N: 0.20 to 0.4510% and Al: not more than 0.10%, and optionally at least one element selected from at least one of the first, second and third groups of elements specified below, and the balance Fe and impurities,
   (b) among the impurities, P is not more than 0.030%, S is not more than 0.005%, and Ti, Zr and Hf are not more than 0.01% respectively, and
   (c) the contents of Cr, Mn and N satisfy the following relationship [1]:

$$2.5Cr+3.4Mn \leqq 300N \qquad [1]$$

wherein the symbols of the elements represent the contents, % by mass, of the respective elements;
   wherein the first group of elements is;
   Mo: 0.3 to 3.0%, W: 0.3 to 6.0%, Nb: 0.001 to 0.20% and Ta: 0.001 to 0.40%;
   wherein the second group of elements is;
   B: 0.0001 to 0.020%, Cu: 0.3 to 5.0%, and Co: 0.3 to 10.00/a; and
   wherein the third group of elements is;
   Mg: 0.0001 to 0.0050%, Ca: 0.0001 to 0.0050%, La: 0.0001 to 0.200%, Ce: 0.0001 to 0.200%, Sm: 0.0001 to 0.40%, Pr: 0.0001 to 0.40%, and Nd: 0.0001 to 0.50%, and
   d) the steel has a tensile strength of not lower than 863 MPa and a yield strength not lower than 534 MPa.

2. A high-strength stainless steel for high-pressure hydrogen gas, according to claim 1, characterized in that the mean austenite grain size is not greater than 20 μm.

3. A high-strength stainless steel for high-pressure hydrogen gas, according to claim 1, characterized in that fine nitride precipitates of not greater than 0.1 μm are dispersed in an amount of not less than 0.005% by volume.

4. A high-strength stainless steel for high-pressure hydrogen gas, according to claim 1, characterized in that fine nitride precipitates of not greater than 0.1 μm are dispersed in an amount of not less than 0.005% by volume, and the fine nitride precipitates are at least partly face-centered cubic in crystal structure.

5. A high-strength stainless steel for high-pressure hydrogen gas, according to claim 1, characterized in that fine nitride precipitates of not greater than 0.1 μm are dispersed in an amount of not less than 0.0050% by volume, the fine nitride precipitates contain not less than 10% by mass of V within them, and the fine nitride precipitates are at least partly face-centered cubic in crystal structure.

6. A high-strength stainless steel for high-pressure hydrogen gas, according to claim 1, characterized in that the mean austenite grain size is not greater than 20 μm, fine nitride precipitates of not greater than 0.1 μm are dispersed in an amount of not less than 0.005% by volume.

7. A high-strength stainless steel for high-pressure hydrogen gas, according to claim 1, characterized in that the mean austenite grain size is not greater than 20 μm, fine nitride precipitates of not greater than 0.1 μm are dispersed in an amount of not less than 0.005% by volume, and the fine nitride precipitates are at least partly face-centered cubic in crystal structure.

8. A high-strength stainless steel for high-pressure hydrogen gas, according to claim 1, characterized in that the mean austenite grain size is not greater than 20 μm, fine nitride precipitates of not greater than 0.1 μm are dispersed in an amount of not less than 0.005% by volume, the fine nitride precipitates contain not less than 100% by mass of V within them, and the fine nitride precipitates are at least partly face-centered cubic in crystal structure.

9. A high-strength stainless steel according to claim 1 wherein the steel contains at least one element selected from the first group of elements.

10. A high-strength stainless steel according to claim 1 wherein the steel contains at least one element selected from the second group of elements.

11. A high-strength stainless steel according to claim 1 wherein the steel contains at least one element selected from the third group of elements.

12. A high-strength stainless steel according to claim 9 wherein the steel contains at least one element selected from the second group of elements.

13. A high-strength stainless steel according to claim 12 wherein the steel contains at least one element selected from the third group of elements.

14. A high-strength stainless steel according to claim 9 wherein the steel contains at least one element selected from the third group of elements.

15. A high-strength stainless steel according to claim 10 wherein the steel contains at least one element selected from the third group of elements.

* * * * *